(12) United States Patent
Martindale

(10) Patent No.: US 7,396,203 B2
(45) Date of Patent: Jul. 8, 2008

(54) SPACER ARRANGEMENT

(75) Inventor: Ian G. Martindale, Derby (GB)

(73) Assignee: Rolls-Royce, plc, London (GB)

( * ) Notice: Subject to any disclaimer, the term of this patent is extended or adjusted under 35 U.S.C. 154(b) by 525 days.

(21) Appl. No.: 11/153,394

(22) Filed: Jun. 16, 2005

(65) Prior Publication Data

US 2006/0013683 A1 Jan. 19, 2006

(30) Foreign Application Priority Data

Jul. 15, 2004 (GB) ................. 0415842.4

(51) Int. Cl.
*F01D 25/24* (2006.01)
*F02C 9/22* (2006.01)

(52) U.S. Cl. ............... 415/136; 416/138; 416/149.4

(58) Field of Classification Search .......... 415/136, 415/149.4, 148, 150, 160, 156, 162, 138
See application file for complete search history.

(56) References Cited

U.S. PATENT DOCUMENTS

| | | | | |
|---|---|---|---|---|
| 2,933,234 A | * | 4/1960 | Neumann | 415/149.4 |
| 3,854,843 A | * | 12/1974 | Penny | 415/197 |
| 5,035,573 A | | 7/1991 | Tseng et al. | |
| 5,228,828 A | * | 7/1993 | Damlis et al. | 415/173.2 |
| 5,333,993 A | * | 8/1994 | Stueber et al. | 415/174.5 |
| 6,406,256 B1 | * | 6/2002 | Marx | 415/138 |
| 6,733,235 B2 | * | 5/2004 | Alford et al. | 415/173.1 |
| 6,896,484 B2 | * | 5/2005 | Diakunchak | 415/173.1 |

FOREIGN PATENT DOCUMENTS

GB   1 533 986   11/1978

* cited by examiner

*Primary Examiner*—Igor Kershteyn
(74) *Attorney, Agent, or Firm*—Oliff & Berridge, PLC

(57) ABSTRACT

A spacer arrangement 1, 40 is provided in which wedges 5, 6; 45, 46 are arranged to have an interface 7, 47 between them such that a thermally variable member 8, 48 can cause relative motion between the wedges 5, 6; 45, 46 to adjust an arrangement lateral dimension dependent upon temperature. In such circumstances with the arrangement 1, 40 positioned within a gap 3 between a casing 14 and unison ring 13, retention of position of that unison ring 13 can be maintained. The unison ring is arranged to adjust position of variable vanes.

18 Claims, 4 Drawing Sheets

SPACER ARRANGEMENT

BACKGROUND OF INVENTION

The present invention relates to a spacer arrangement and more particularly to such arrangements used in gas turbine engines in such situations as to accommodate for thermal variations, etc between such components as between an engine casing and unison ring.

Operation of gas turbine engines is well known. Essentially, a number of compressor blade assemblies are associated with a number of turbine blade assemblies such that air is compressed by the compressor assemblies into a combustor where fuel and that compressed air are combusted in order to expel a thrust gas flow through the turbine which in turn thereby drives the compressor assemblies as well as provide thrust in an aircraft or shaft rotation in stationery engines. Clearly, in such arrangements, appropriate control and manipulation of gas flows is important. Similarly, account must be taken of the variations in engine dimensions due to thermal expansion and deformations. For example, it is relatively common for a gas turbine engine to incorporate variable vanes for utilisation between different compressor blade stages and/or turbine blade stages in order that the gas flow is orientated correctly for a subsequent compressor blade stage, or turbine blade stage, for efficient or higher performance operation. These variable vanes are typically adjusted utilising a so called unison ring assembled on the periphery of the gas turbine engine around that engine's casing. In any event, accuracy and reproducibility of operation is required, so means for suppressing variations of the compressor casing, or turbine casing, and/or unison ring growth are beneficial.

Previously, such casing and unison ring growth suppression has been achieved by a spacer arrangement comprising a resilient element to provide balanced compression between the casing and unison ring for retention of position. More recently as shown in U.K. patent application no. 0326544.4, bowed bi-metal strips have been used to alter the compression force in response to temperature. However, such strips may not be able to provide sufficient compression force over the full range of potential variation in gap between the casing and unison ring.

SUMMARY OF INVENTION

In accordance with the present invention there is provided a spacer arrangement for a gas turbine engine, the arrangement comprising a first wedge and a second wedge with an interface between the first and second wedges, the first and second wedges are arranged between a first component and a second component, and a thermally variable member is arranged to act across the first wedge and the second wedge for thermally dependent displacement about the interface whereby a desired lateral dimension of the arrangement is varied for positional reaction across a gap between the first and second components.

Generally, the interface is angular between the first wedge and the second wedge.

Normally, the thermally dependent displacement will be a slide motion along the interface. Alternatively, the thermally dependent displacement will be a divergent separation across the interface.

Normally, the lateral dimension varied will be between respective surfaces of the first wedge and the second wedge either side of the interface. Alternatively, the lateral dimension varied will be between the surfaces of the first wedge and the second wedge at either end of the interface.

Typically, the thermally variable member is entrant within the interface. Advantageously, the thermally variable member is keyed into reciprocal recesses of the interface. Possibly, the thermally variable member has a dumbbell shape. Normally, the thermally variable member will have a high co-efficient of thermal expansion or be a shape memory alloy.

Alternatively, the thermally variable member is a band secured either side of the arrangement and extending about one end of the arrangement to engage one of the first wedge or the second wedge. Typically the band will be a bi-metallic strip anchored either side of the arrangement.

Normally, the first and the second wedge will be formed from a low co-efficient of thermal expansion material. Possibly, one wedge is fixed to a structure whilst the other is allowed to slide upon the interface and/or relative to a component.

Further, in accordance with the present invention there is provided a vane assembly for a gas turbine engine wherein the vane assembly incorporates a spacer arrangement as described above.

Typically, the vanes within the vane assembly are variable in orientation by rotation about spindles secured to a casing and varied utilising a unison ring. Additionally, the spacer arrangement is utilised between the unison ring and the casing in order to control the effective gap between the casing and the unison ring.

Also, in accordance with the present invention there is provided a gas turbine engine incorporating a spacer arrangement as described above. Possibly, the gas turbine engine incorporates a casing and a unison ring with the arrangement provided to ensure consistent relative positioning of the unison ring within the gas turbine engine.

Embodiments of the present invention will now be described by way of example only and with reference to the accompanying drawings in which;

DETAILED DESCRIPTION OF THE INVENTION

Figure 1:
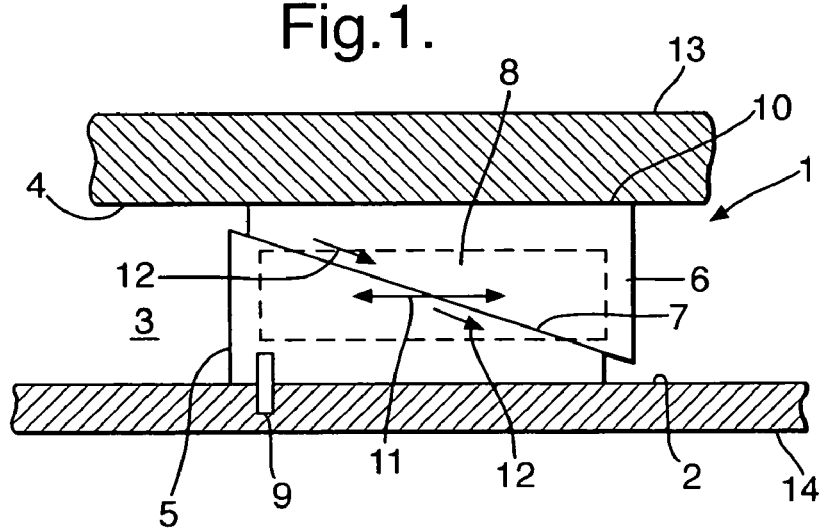
FIG. 1 is a schematic side depiction of a first embodiment of a spacer arrangement in accordance with the present invention.

Referring to FIG. 1 illustrating a schematic side elevation of a first embodiment of a spacer arrangement 1 in accordance with the present invention. Thus, a surface 2 of a casing 14 is spaced by a gap 3 from an opposing surface 4 of a unison ring 13. Within the gap 3 the spacer arrangement 1 in accordance with the present invention is provided by two wedges 5, 6 with an interface 7 between them. Within this interface 7 a thermally variable member shown in broken line 8 is provided. With the member 8 located between the wedges 5, 6 the spacer arrangement 1 constitutes a robust assembly extending between the surface 2 of the casing 14 and the opposing surface 4 of the unison ring 13. Furthermore, the wedges 5, 6 are normally in compression. Generally, as depicted, one wedge 5 is secured or anchored to the casing 14 using a peg or pins 9. However, as an alternative form of fixing an adhesive may be used.

As indicated above, variations in the gap 3 due to thermal cycling can displace location of the unison ring 13 and therefore render the accuracy and uniformity of adjustment of associated variable vanes susceptible to deviation. It will be understood that typically the unison 10 ring 13 rotates around the axis of the casing 14 so that the surface 4 of the unison ring 13 slides against the adjacent surface 10 of the wedge 6.

The purpose of the spacer arrangement 1 in accordance with the present invention is to ensure consistent presentation of the unison ring 13. In such circumstances the wedges 5, 6 are arranged such that there can be movement either laterally in the direction of arrowheads 11 or sliding in the direction of arrowheads 12. Such movement adjusts the lateral, e.g. radial, dimension of the combined wedges 5, 6 such that it is substantially at least the same as or slightly greater than the gap 3. It may be slightly greater in order to create compression for positional reaction. It will be understood that normally a number of spacer arrangements 1 in accordance with the present invention are provided around the circumference of a concentric combination of unison ring 13 and casing 14 such that these spacer arrangements 1 act in concert to ensure appropriate presentation in use, that is to ensure the unison ring 13 and casing 14 remain concentric.

As indicated above, the principal cause of deviation of a unison ring 13 is through thermal cycling of an engine incorporating the unison ring. It will be understood that other factors such as centrifugal forces, vibration and torque displacement will generally be accommodated by existing suspension mechanisms, but these systems cannot actively compensate for differential thermal expansion. The present invention ensures that the thermally variable component 8 expands and contracts in order to adjust for actual temperature such that the lateral, e.g. radial, dimension between the opposing side surfaces of the wedges 5, 6 either side of the interface 7 increase or decrease dependent upon temperature in order to maintain the unison ring 13 in position.

In the above circumstances the thermally variable member 8 acts as an actuator for the spacer arrangement 1 in accordance with the present invention. The member 8 will be formed from a suitable high co-efficient of thermal expansion material or shaped memory alloy or other thermally expandable mechanism in order to create the movements for displacement in the directions of arrowheads 11, 12. It will be understood that the member 8 can be specified in order to create omni-directional expansion or through appropriate choice of materials uni-directional expansion in order to create the desired motion for displacement between the wedges 5, 6. In any event the objective is to combine the choice of wedges 5, 6 with thermally variable member 8 in order to ensure that there is correct positioning of the unison ring 13 throughout the expected operational thermal ranges, that is to say to ensure that the gap 3 is substantially maintained by action of the spacer arrangement 1 in association with other spacer arrangements 1 appropriately positioned around the unison ring 13 between that unison ring 13 and the casing 14.

As shown in FIG. 1, normally the interface 7 will be angular in order to achieve the necessary variation in the lateral, e.g. radial, dimension between opposing sides of the wedges 5, 6 either side of the interface 7. In such circumstances, with an angular interface 7 it will be appreciated that sliding along that interface 7 will adjust the combined lateral dimension of the wedges 5, 6 to accommodate and slightly pressurise across the gap 3, and so achieve a consistent presentation of the unison ring 13.

Figure 2:
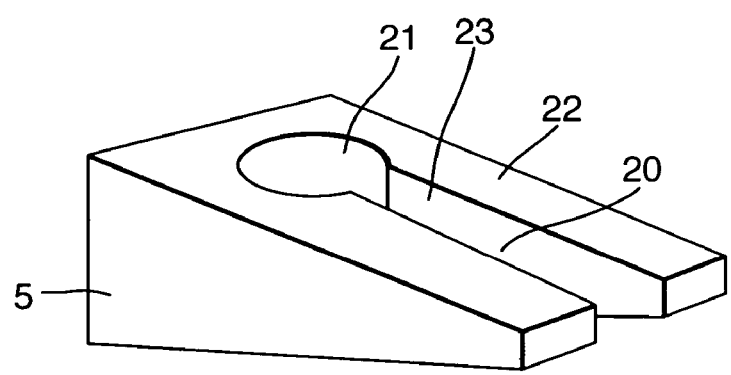
FIG. 2 is a schematic front perspective view of a wedge utilised with regard to the first embodiment depicted in FIG. 1.
Figure 3:
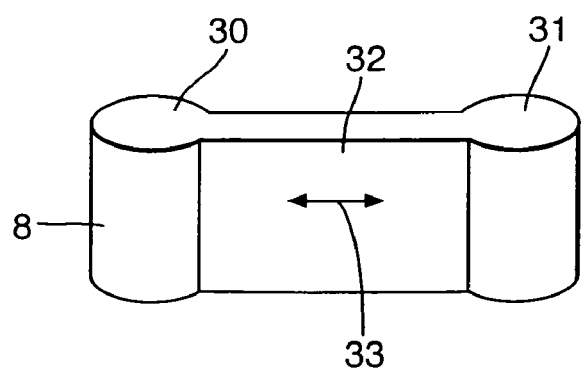
FIG. 3 is a front perspective view of a thermally variable member utilised in accordance with the first embodiment of the invention depicted in FIG. 1 and in association with the wedge depicted in FIG. 2.

FIGS. 2 and 3 illustrate in schematic front perspective, appropriate structural configurations for a wedge 5 in accordance with the present invention in FIG. 2 and in FIG. 3 a thermally variable member 8 to act as an actuator between wedges 5, 6.

Referring to FIG. 2, wedge 5 incorporates a recess 20 having a substantially key hole configuration with a central slot 23 and bulbous end 21. It will be appreciated that the opposing wedge 6 (FIG. 1) will have a similar configuration but be inverted such that the central slots 23 are aligned, but the bulbous ends 21 are positioned at opposing ends of that central slot 23. An interface surface 22 between the wedges 5, 6 will be arranged to allow sliding therealong in order to create the desired lateral, e.g. radial, dimension variation as a result of the thermally variable member 8 being located within the recesses 20.

FIG. 3 illustrates a typical configuration for a thermally variable member 8 in accordance with the present invention and suitable for use with a recess 20 in a wedge 5 as described with respect to FIG. 2. It will be appreciated that keyed location between a thermally variable member 8 and a recess 20 in the opposed wedges 5, 6 is important to ensure that the thermal variation is mechanically coupled to the wedges 5,6 in order to create the desired movement and so adjustment of the dimension for positional retention despite thermal variations. The particular thermally variable member 8 depicted in FIG. 3 incorporates cylindrical ends 30, 31 which are coupled by a waist band 32. The cylindrical ends 30, 31 are arranged to enter respective bulbous ends 21 in the wedges 5, 6 (see bulbous end 21 in FIG. 2) whilst the waist band 32 extends along the central slot 23 of those wedges 5, 6. In such circumstances, the member's 8 position between the wedges 5, 6 is substantially retained.

It will be understood that by creating the cylindrical ends 30, 31 with a waist band 32, appropriate tuning of the thermal expansion and contraction of the member 8 can be utilised to achieve the desired variation for adjustment of the lateral, e.g. radial, dimension of the spacer arrangement 1 with temperature for retaining position of a unison ring 13 in use. It will be noted that the casing expands more than the unison ring and therefore would be binding between spacers and unison ring when hot. The space arrangement reduces height when hot and increases height (radially) when cold to control the effective gap between casing and unison ring. Thermal expansion is a function of length, and temperature. Thus, the bulkier cylindrical ends 30, 31 will tend not to displace relative to the wedges 5, 6, but allow the waist band 32 to expand and contract at will according to temperature. In such circumstances with the essential anchoring of the cylindrical ends 30, 31 located within the bulbous ends (21 in FIG. 2) of the wedges 5, 6, there will be relative movement of those wedges 5, 6 dependent upon the thermal expansion or contraction principally of the waist band 32. The wedges 5, 6 are drawn, through sliding engagement upon the interface 7 (FIG. 1), to adjust with temperature the lateral, e.g. radial, dimension across the wedges 5, 6 between opposing outer surfaces either side of the interface 7. This adjustment is constrained and the arrangement will normally be arranged and specified so that there is an outward compression force from the arrangement between the casing 14 and the unison ring 13.

It will be appreciated that other associations between the wedges 5, 6 and the thermally variable component 8 can be utilised. For example, a H shaped thermally variable member could be used or a member with inward or outwardly presented triangular ends used with a waist band therebetween in order to achieve the desired expansion or contraction in order to create the motion between the wedges for dimensional variation dependent upon temperature. It will also be understood that the respective ends and waist band of the thermally variable member could be arranged to achieve the differential thermal expansion effects. Thus, for example the band could be narrower or broader in order to achieve a first directional thermal expansion or contraction as required whilst the ends having a bulkier nature or through choice of a different type of material could achieve further expansion or contraction over a different temperature range in order that a programmed variation in the spacer arrangement could be achieved. In any event generally the arrangement will ensure there is at least a slight compression between a casing and unison ring in order to ensure appropriate positioning of that unison ring within the casing.

Generally, in accordance with the configuration of the first embodiment of the invention depicted in FIGS. 1 to 3, it will be understood that as temperature increases the thermally variable member 8 acting as an actuator element pushes the wedges 5, 6 apart as it expands and the lateral, radial, dimension across the wedges 5, 6 decreases to retain concentricity with a smaller gap 3. As temperature is reduced the thermally variable member 8 again varies in dimensions and contracts pulling the wedges 5, 6 together such that there is sliding upon the interface 7 and the lateral, radial, dimension across the wedges 5, 6 increases to retain concentricity with a larger gap 3.

Figure 4:
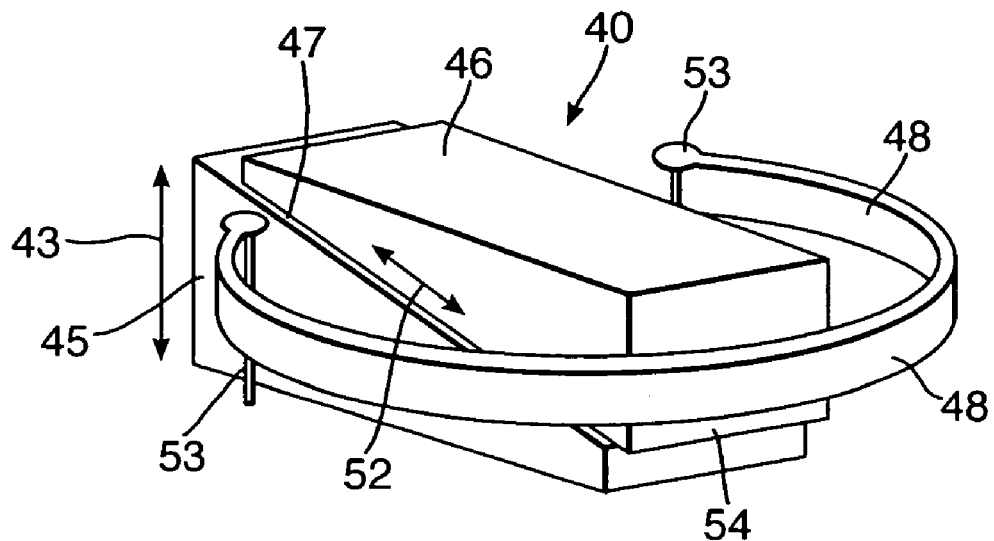
FIG. 4 is a schematic front perspective view of a second embodiment of an arrangement in accordance with the present invention.
Figure 5:
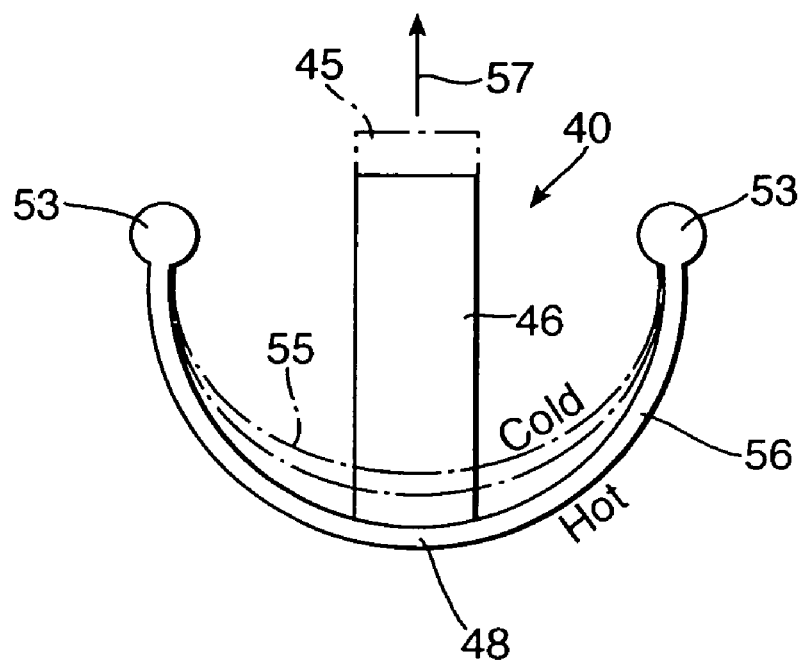
FIG. 5 is a schematic plan view of the arrangement depicted in FIG. 4.

FIGS. 4 and 5 illustrate a second embodiment of a spacer arrangement 40 in accordance with the present invention. FIG. 4 is a schematic front perspective of the spacer arrangement 40 whilst FIG. 5 is a schematic plan view. The spacer arrangement 40 comprises wedges 45, 46 associated together with an interface 47 between them. The wedges 45, 46 can move and will generally slide upon the interface 47 in the direction of arrowhead 52.

In accordance with the second embodiment depicted in FIG. 4 and FIG. 5, a thermally variable band member 48 is secured either side of the wedges 45, 46 through appropriate mountings 53. These mountings 53 will generally be secured in the casing and possibly will comprise pins or pegs entering in a similar fashion to mounting pegs for securing a wedge 45 in a similar fashion to wedge 5 in FIG. 1. The thermally variable band member 48 extends about a thick end 54 of the wedge 46 in order to engage it.

The thermally variable band member 48 will typically be a bi-metallic strip which expands and contracts through a temperature range. In such circumstances, and as depicted in FIG. 5, when cold the band member 48 contracts to a configuration depicted by broken lines 55 bringing the wedges 45, 46 into close association and therefore increasing their lateral, e.g. radial, dimension 43 (see FIG. 4). When hot the band member 48 expands to the configuration depicted in solid line 56 in FIG. 5. Thus, if the thick end 54 of the wedge 46 is secured to the band member 48 and that band member 48 acts as a bow or arch, the contraction between the hot configuration 56 and cold configuration 55 creates movement in the direction of arrowhead 57.

It will be appreciated that alternative embodiments and modifications to the present invention are envisaged within the context of providing adjustment in the lateral dimension of the arrangement. Thus, the band member 48 may provide for larger movements of the wedges 45, 46 in comparison with the entrant member 8 utilised with respect to the first embodiment depicted in FIGS. 1 to 3. Alternatively, it may be possible to provide that end surfaces at either end of the wedges provide engagement between opposed surfaces of the unison ring and casing for variation in accordance with temperature.

Figure 6:
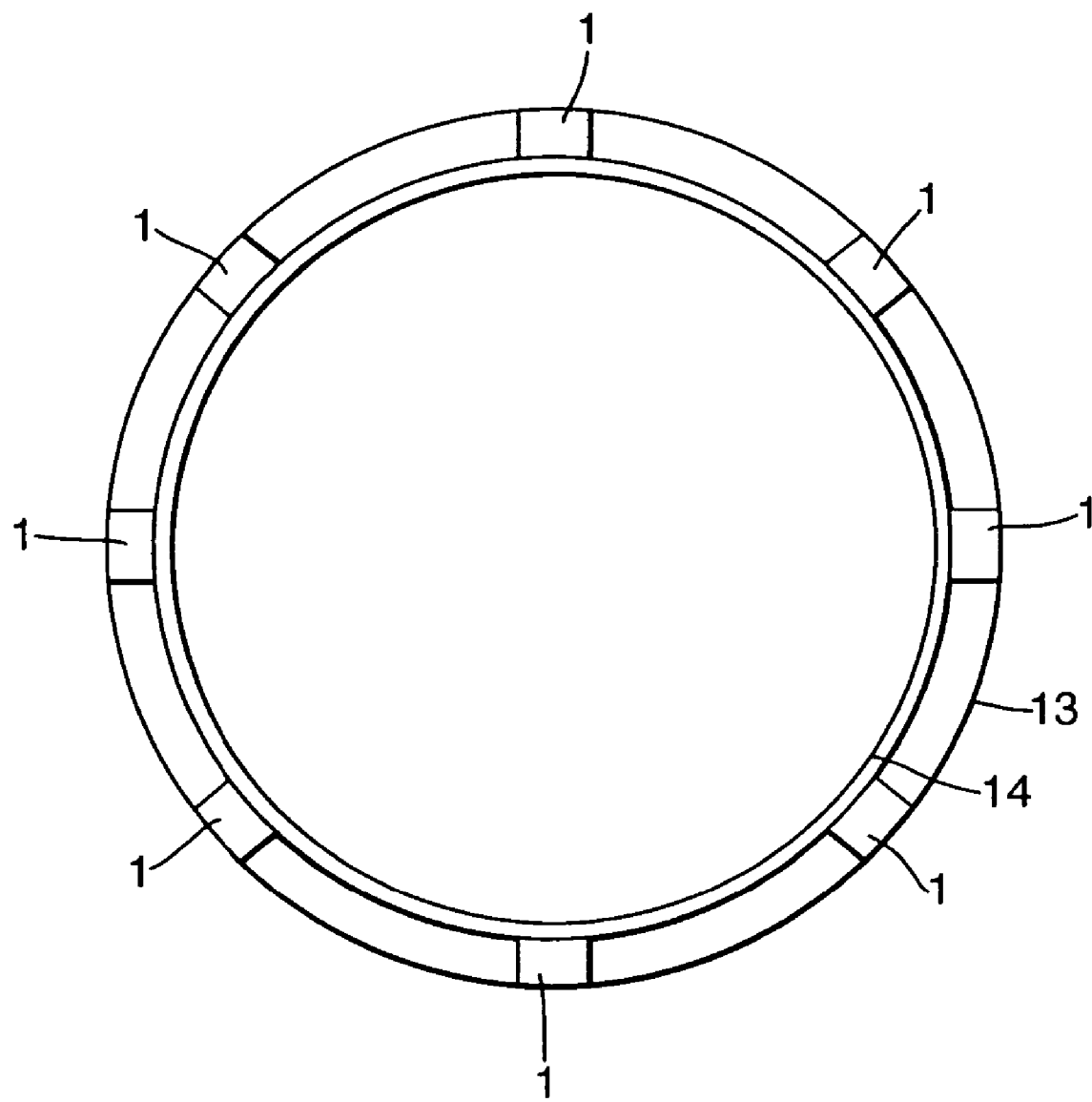
FIG. 6 is a depiction of spacer arrangement position in accordance with the present invention.

FIG. 6 provides a schematic illustration of the positioning of spacer arrangements in accordance with the present invention between a casing 14 and a unison ring 13. Thus, spacer arrangements 62 in accordance with the present invention are arranged in the gap between the unison ring 13 and the casing 14 such that they act in concert to retain position of that unison ring 13 throughout the temperature ranges expected. It will be understood that the unison ring 13 could be displaced laterally or vertically such that the positioning of any variable vanes associated with that unison ring 13 would then also be displaced and the objective of uniform variable vane operation is disrupted. By use of spacer arrangements 1 in accordance with the present invention, generally in opposed pairs, positioning of the unison ring 13 can be retained by the compressive suspension between those spacer arrangements 1 despite variations in operational temperature.

The spacer arrangement may be used for a unison ring for variable vanes of a compressor or for variable stator vanes of a turbine.

Figure 7:
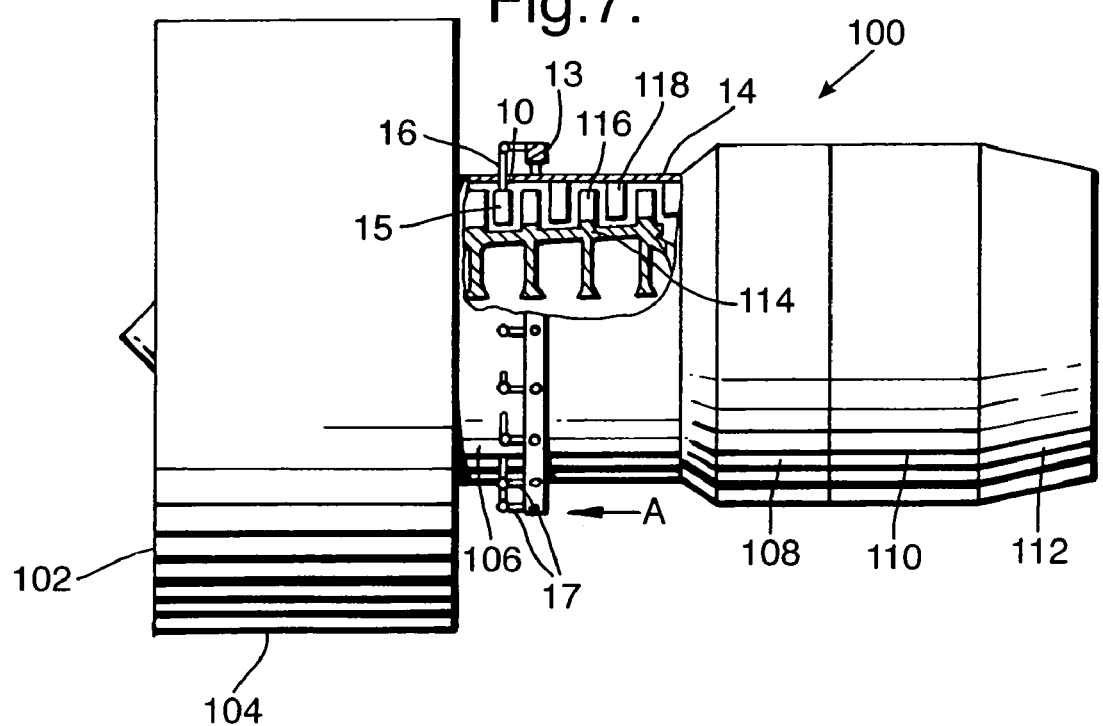
FIG. 7 is a schematic depiction of a gas turbine engine.

For contextual illustration, FIG. 7 provides a schematic depiction of a gas turbine engine 110. The gas turbine engine 110 comprises an inlet 102, a fan section 104, a compressor section 106, a combustion section 108, a turbine section 110 and an exhaust 112. The compressor section comprises a compressor rotor 114, which carries a plurality of stages of rotor blades 116 and there are vanes 118 secured to the casing 14.

Figure 8:
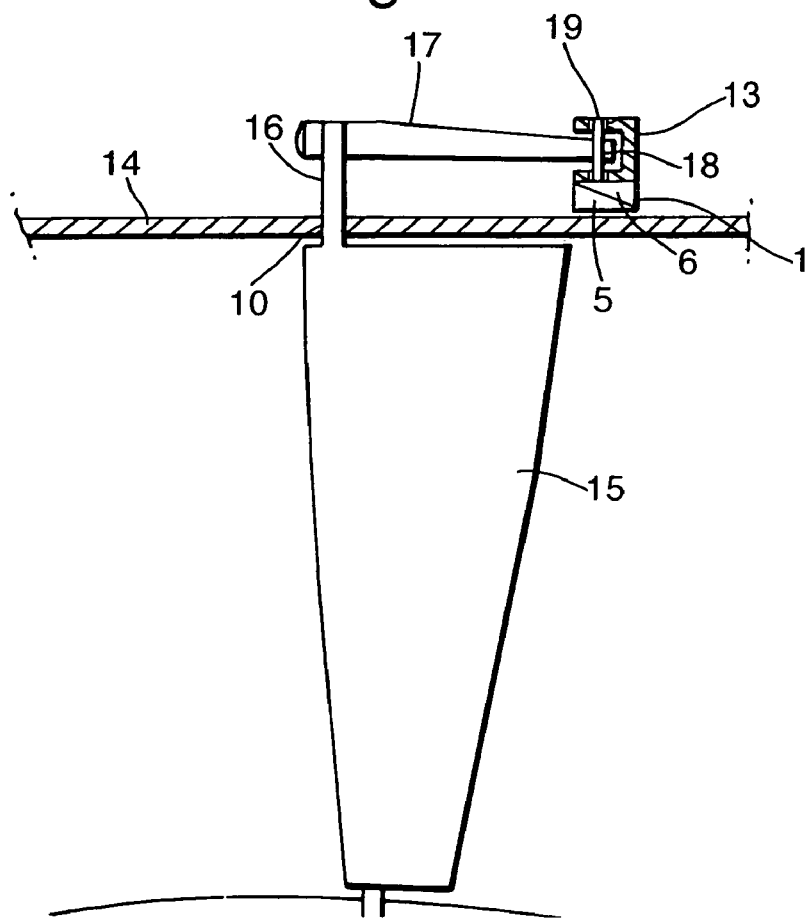
FIG. 8 is a schematic depiction of a variable vane arrangement.

FIG. 8 provides a schematic illustration of a variable vane arrangement utilised in a gas turbine engine such as with regard to vanes 118. In FIG. 8 variable vanes 15 are circumferentially arranged and extend radially. Each variable vane 15 is connected to the unison ring 13 by an operating lever 17. The operating levers 17 are rotatably mounted on the unison ring 13 by radially extending spindles 18 which extend through respective apertures 19 in the unison ring 13. The variable vanes 15 have spindles 16 at their radially outer ends, which extend through respective apertures 10 in the casing 14.

In view of the above, it will be appreciated that movement of the wedges can be axial or circumferential. Thus, the wedges 5, 6 can be arranged such that these wedges 5, 6 extend axially along the casing 14 such that the thick and thin ends of the wedges 5, 6 are axially spaced along the casing 14 and so relative movement of the wedges 5, 6 is axial relative to the casing. Alternatively, the wedges 5, 6 may be arranged so the wedges extend circumferentially along the casing 14 such that the relative movement of the wedges 5, 6 is circumferential relative to that casing. Possibly, the surface of the wedges 5, 6 may be contoured to match that of the unison ring 13 or casing 14.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A spacer arrangement for a gas turbine engine, the arrangement comprising a first wedge and a second wedge with an interface between the first wedge and the second wedges, the first and second wedges are arranged between a first component and a second component, and a thermally variable member is arranged to act across the first wedge and the second wedge for thermally dependent displacement about the interface whereby a desired lateral dimension of the arrangement is varied for positional reaction across a gap between the first and the second components.

2. An arrangement as claimed in claim 1 wherein the thermally dependent displacement is a slide motion along the interface.

3. An arrangement as claimed in claim 1 wherein the thermally dependent displacement is a divergent separation across the interface.

4. An arrangement as claimed in claim 1 wherein the lateral dimension varied is between respective surfaces of the first wedge and the second wedge either side of the interface.

5. An arrangement as claimed in claim 1 wherein the lateral dimension varied is between the surfaces of the first wedge and the second wedge at either end of the interface.

6. An arrangement as claimed in any claim 1 wherein the thermally variable member is entrant within the interface.

7. An arrangement as claimed in claim 1 wherein the thermally variable member is keyed into reciprocal recesses of the interface.

8. An arrangement as claimed in claim 7 wherein the thermally variable member has a dumb-bell shape.

9. An arrangement as claimed in claim 1 wherein the thermally variable member is selected from the group comprising a high co-efficient of thermal expansion material and a shape memory alloy.

10. An arrangement as claimed in claim 1 wherein the thermally variable member is a band secured either side of the arrangement and extending about one end of the arrangement to engage one of the first wedge or the second wedge.

11. An arrangement as claimed in claim 10 wherein the band is a bi-metallic strip anchored either side of the arrangement.

12. An arrangement as claimed in claim 1 wherein the first and second wedge is formed from a low co-efficient of thermal expansion material.

13. An arrangement as claimed in claim 1 wherein one wedge is arranged to be fixed to a structure whilst the other is arranged to be allowed to slide upon the interface and/or relative to a component.

14. A vane assembly for a gas turbine engine wherein that vane assembly incorporates a spacer arrangement as claimed in claim 1.

15. A vane assembly as claimed in claim 14 wherein the vane assembly comprises a plurality of vanes, the vanes have spindles, the spindles extend through apertures in a casing, a unison ring is arranged around the casing, the vanes of the vane assembly are variable in orientation by rotation of the spindles in apertures in the casing utilising a unison ring.

16. An assembly as claimed in claim 15 wherein the spacer arrangement is utilised between the unison ring and the casing in order to control the effective gap between the casing and the unison ring.

17. A gas turbine engine incorporating a spacer arrangement as claimed in claim 1.

18. A gas turbine engine as claimed in claim 17 wherein the gas turbine engine incorporates a casing and a unison ring with the arrangement provided to ensure consistent relative positioning of the unison ring within the gas turbine engine.

* * * * *